Inventor
Raymond J. Yarema
By James J. Jenninger, Jr.
Attorney

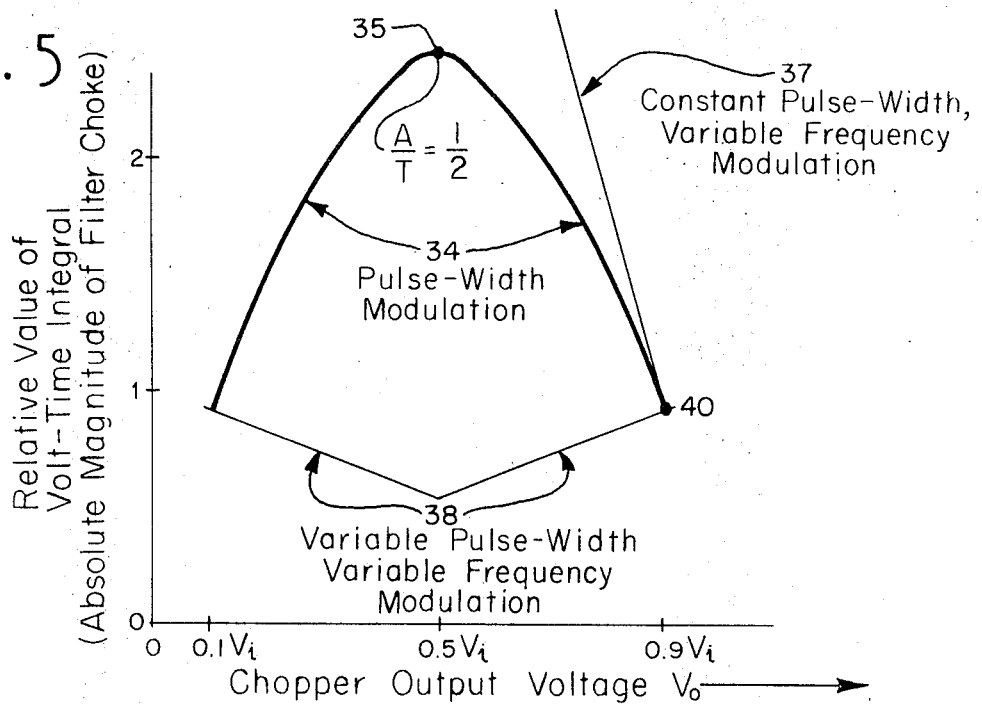
FIG. 5
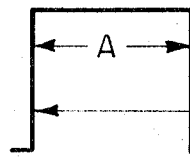
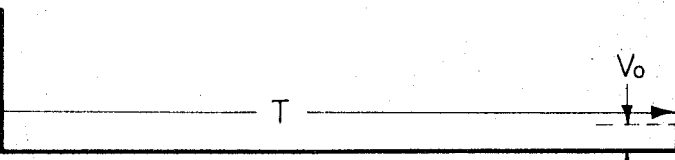
FIG. 6a
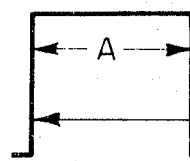
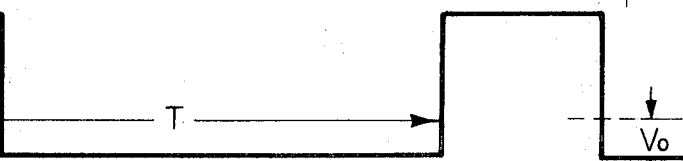
FIG. 6b
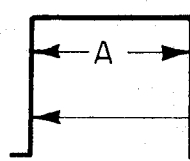
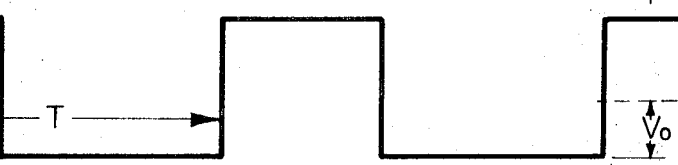
FIG. 6c
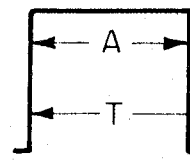
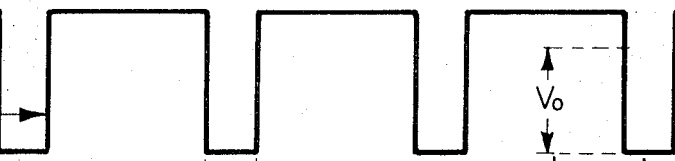
FIG. 6d
Inventor
Raymond J. Yarema
By James J. Jennings, Jr.
Attorney

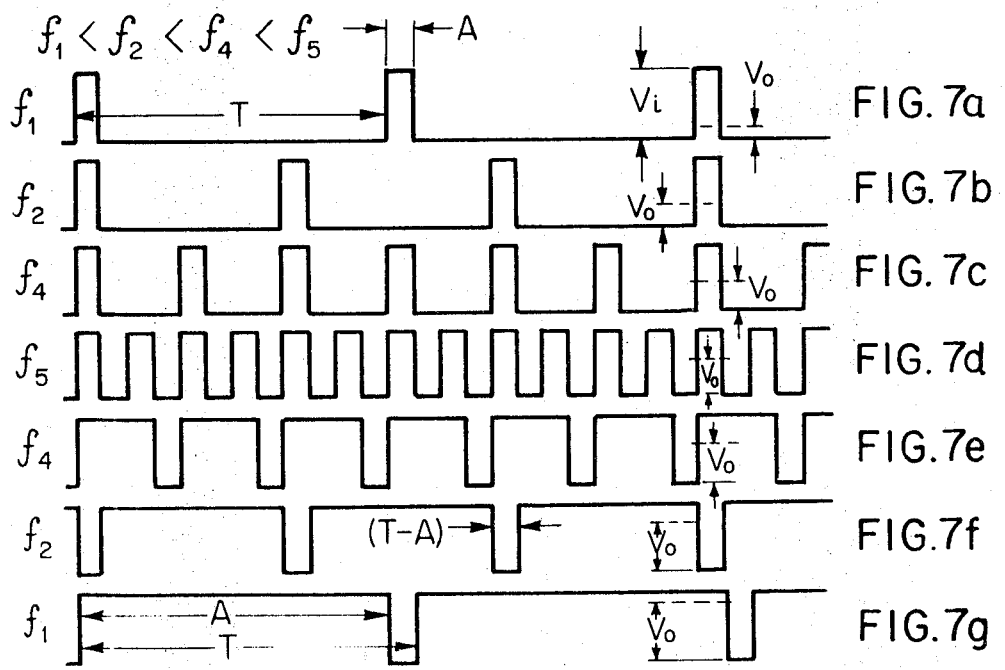
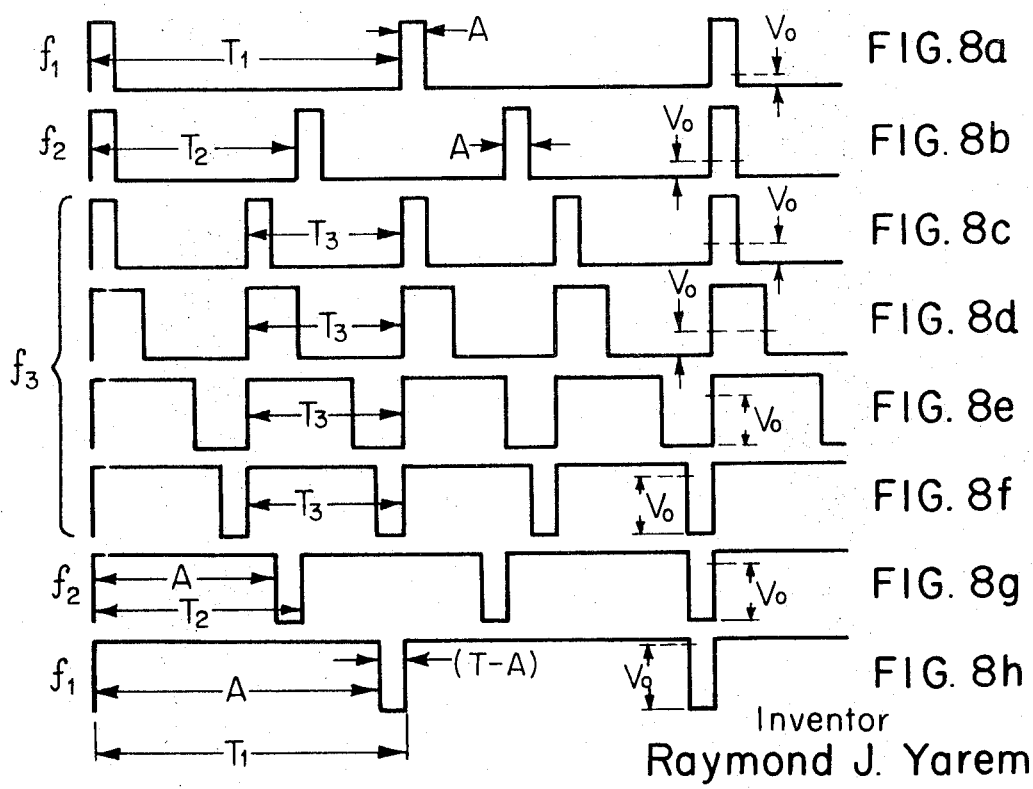

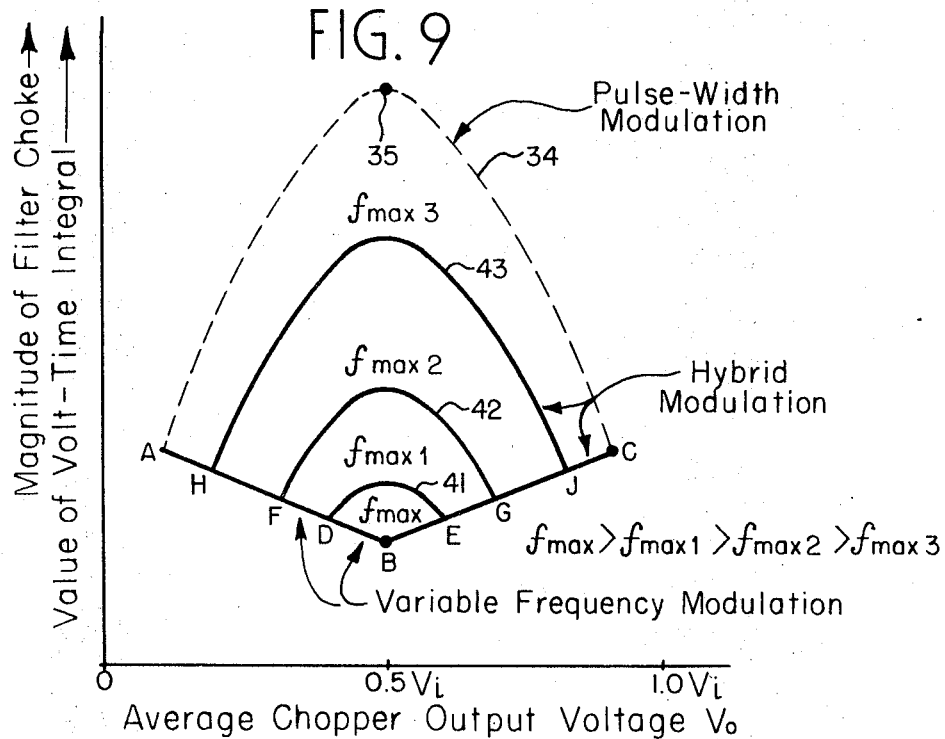
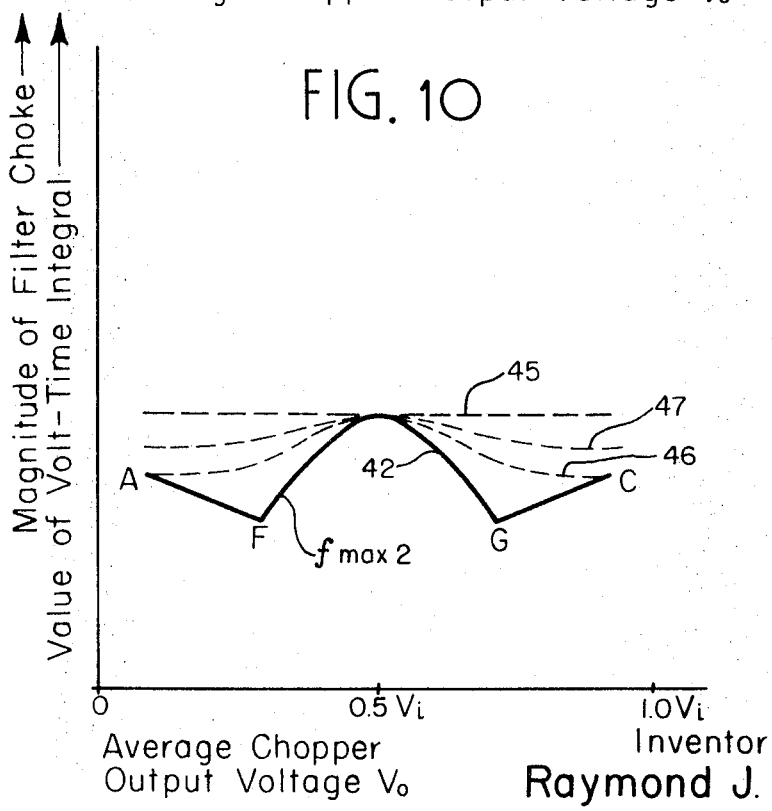

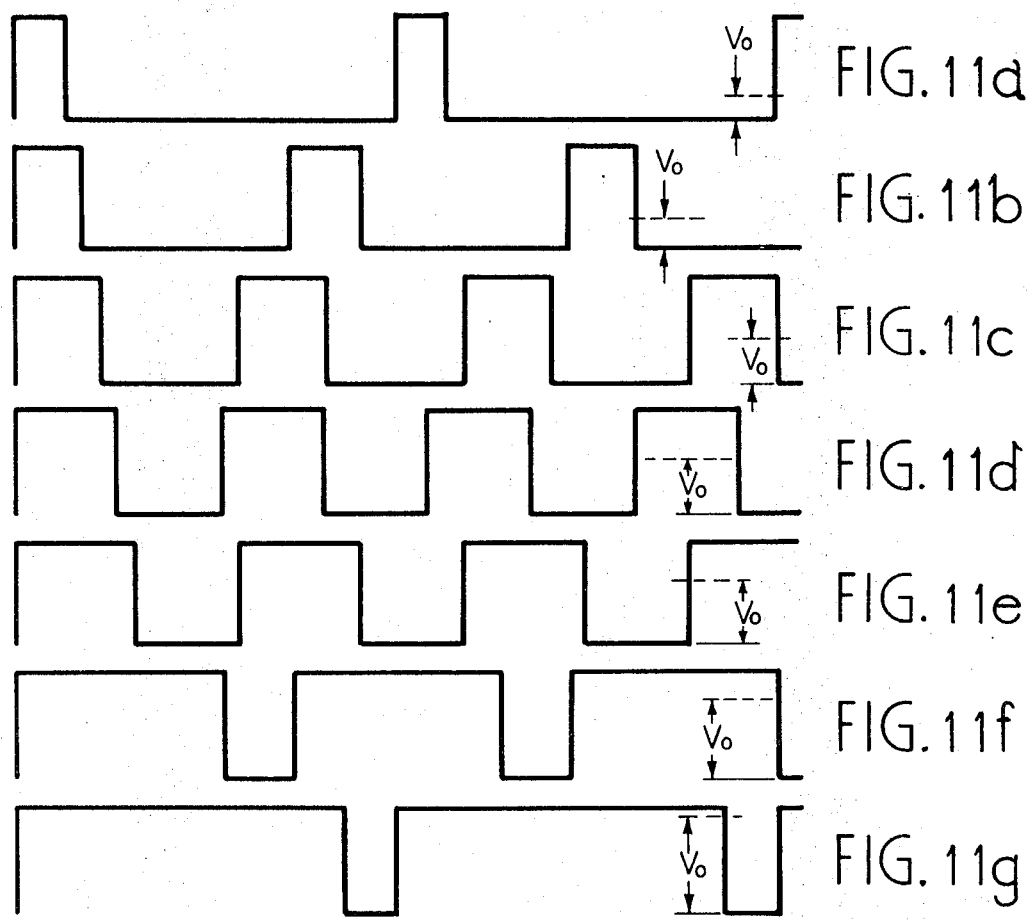
FIG. 11a
FIG. 11b
FIG. 11c
FIG. 11d
FIG. 11e
FIG. 11f
FIG. 11g
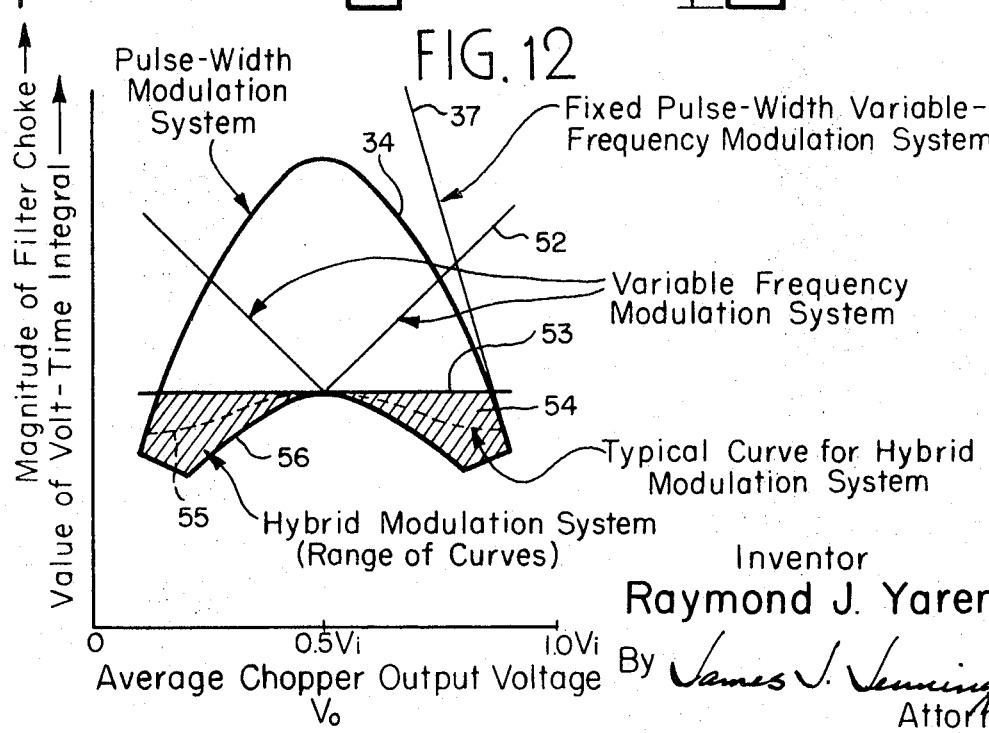
FIG. 12

Jan. 26, 1971  R. J. YAREMA  3,559,029
CONTROL CIRCUIT FOR REGULATING A DC-TO-DC CONVERTER
Filed Nov. 22, 1968  9 Sheets-Sheet 7

Inventor
Raymond J. Yarema
By James J. Jennings, Jr.
Attorney

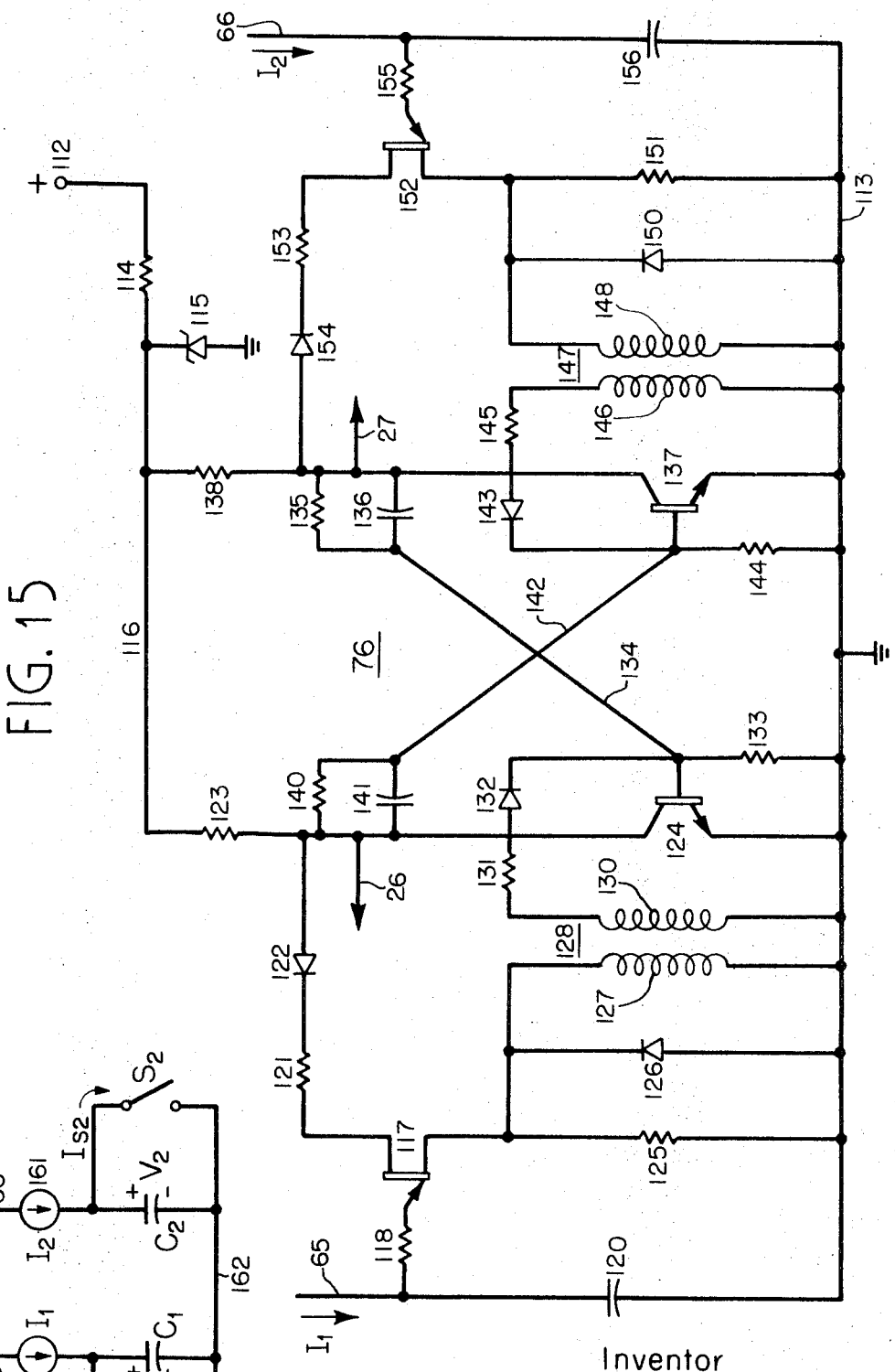

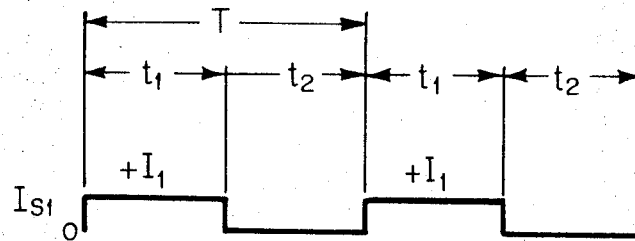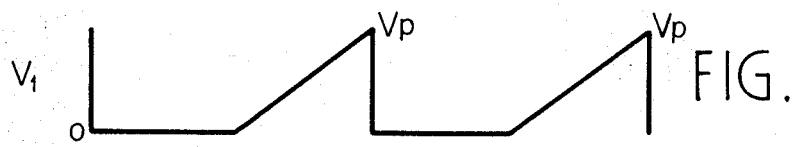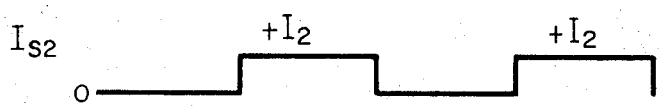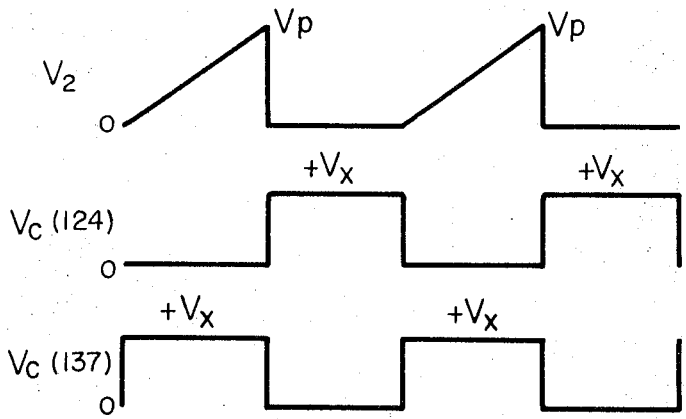

United States Patent Office 3,559,029
Patented Jan. 26, 1971

3,559,029
CONTROL CIRCUIT FOR REGULATING A DC-TO-DC CONVERTER
Raymond J. Yarema, La Grange Park, Ill., assignor to Borg-Warner Corporation, Chicago, Ill., a corporation of Delaware
Filed Nov. 22, 1968, Ser. No. 778,044
Int. Cl. H02m 3/22
U.S. Cl. 321—2    9 Claims

ABSTRACT OF THE DISCLOSURE

A high-power DC-to-DC converter (or "chopper") system provides an input voltage $V_i$ of substantially constant level to a chopper which includes a switch. The opened and closed times of the switch are controlled to pass an output voltage $V_o$ of variable magnitude through a filter to a load. A control circuit is connected to actuate the chopper over a variable frequency range, and practical operating conditions such as heating of the switch impose an upper limit on this frequency range. The chopper is operated such that the output voltage $V_o$ is one-half the input voltage $V_i$ at the maximum operating frequency of the chopper. To provide levels of output voltage $V_o$ less than half $V_i$, the frequency is gradually reduced as the chopper on dwell time is maintained approximately constant or allowed to decrease. To provide levels of output voltage $V_o$ greater than one-half the input voltage $V_i$, the chopper operating frequency is gradually reduced as the chopper off dwell time is maintained substantially constant or allowed to decrease.

BACKGROUND OF THE INVENTION

A chopper or DC-to-DC converter in general comprises a switching circuit supplied with a DC bus voltage $V_i$ and operable to provide a variable DC output voltage $V_o$ which is a fraction of the input voltage level $V_i$. This is accomplished by actuating a switch, frequently a semiconductor switch such as a silicon controlled rectifier (SCR) or a power transistor, to apply either virtually the full DC bus voltage $V_i$ or substantially zero voltage to a filter which is coupled between the chopper and the load to smooth the output from the chopper. The DC bus voltage $V_i$ may be provided from any suitable source, such as a battery, rectifier circuit, fuel cell, or other unit. The filter generally has an inductor and a capacitor, and provides a DC voltage which is approximately equal to the average output voltage level of the chopper. This average output voltage $V_o$ in turn is varied by changing the length of time for which the full DC bus voltage is passed to the filter, termed the "on dwell time" or pulse width of the chopper, or the length of time in which zero voltage is applied to the filter, termed the "off dwell time" of the chopper. Those skilled in the art will appreciate that this average output voltage $V_o$ will also be a function of any variation or modulation of the input voltage level $V_i$. That is, if any other system of energizing the input circuit to the chopper is utilized in place of the two-level voltage arrangement just described wherein the full input voltage $V_i$ or zero input voltage is applied, then the output voltage $V_o$ will be a function not only of the chopper on dwell time and off dwell time, but also of the modulation of the input voltage $V_i$ applied to the chopper.

Various characteristics of the chopper system and its semiconductor components impose limits on the time durations of the on dwell time and the off dwell time of the chopper, in addition to limitations on the maximum chopper operating frequency. For example a certain minimum time is required for effective commutation of an SCR. Moreover rapid switching of a chopper circuit above a practical maximum produces overheating and consequent destruction of the semiconductors. With previous chopper systems it has been found that, particularly in high power chopper applications, in observing the maximum operating frequency and minimum pulse width limitations of the chopper it is not possible to provide an extended output voltage range without greatly oversizing the filter choke. As a corollary it has been found that the value of the volt-time integral applied to the filter choke, which is also a measure of the physical size and thus the cost of the filter choke, varies considerably at the different values of the average output voltage $V_o$ produced by the chopper.

A salient aspect of the present invention is a control circuit for operating a chopper system to provide a range of average output voltage $V_o$ which extends virtually from zero to the full DC input voltage $V_i$. A corollary consideration of this invention is to provide a control circuit for regulating the chopper operation so as to produce a minimum value of the volt-time integral over the output voltage range, thereby minimizing the physical size (and thus the cost) of the filter for a given chopper system.

SUMMARY OF THE INVENTION

The present invention is useful with a DC-to-DC conversion system in which a load is energized through a filter at an output voltage level $V_o$ determined by a chopper circuit which includes a pair of semiconductor switches. An input circuit supplies an input voltage or bus voltage $V_i$ to the chopper, and the on and off dwell times of the chopper itself are determined by signals received from a control circuit. Particularly in accordance with this invention, the control circuit includes input means for providing a variable input signal to a compensating means which minimizes changes in the input signal as a function of temperature changes. Difference amplifier means coupled to the compensating means has first and second output conductors for providing respective first and second complementary signals. First and second signal channels are individually coupled between the first and second output conductors of the difference amplifier means and corresponding first and second input connections of a flip-flop stage, to change the state of the flip-flop each time one of the first and second complementary signals reaches a predetermined level. Gating signals are provided over the output connections of the flip-flop stage to regulate turn-on and turn-off of the semiconductor switches in the chopper.

THE DRAWINGS

In the several figures of the drawings like reference numerals identify like elements, and in those drawings:

FIGS. 4 and 5 are graphical representations useful in understanding various characteristics of chopper systems;

FIG. 6 illustrates waveforms of a known method of chopper operation;

FIGS. 7 and 8 depict waveforms illustrating chopper operation as regulated by the control circuit of this invention;

FIGS. 9 and 10 are graphical illustrations useful in understanding this invention;

FIG. 11 illustrates waveforms denoting chopper operation in a variation of this invention;

FIG. 12 is a graphical illustration contrasting chopper operation in accordance with this invention with other methods of chopper operation;

FIGS. 14 and 15 are schematic diagrams depicting details of the control circuit shown generally in FIG. 13; and FIG. 16 is an equivalent circuit, and FIG. 17 illustrates waveforms, useful in understanding operation of the control circuit shown in FIGS. 13–15.

GENERAL CHOPPER OPERATION

Figure 1:
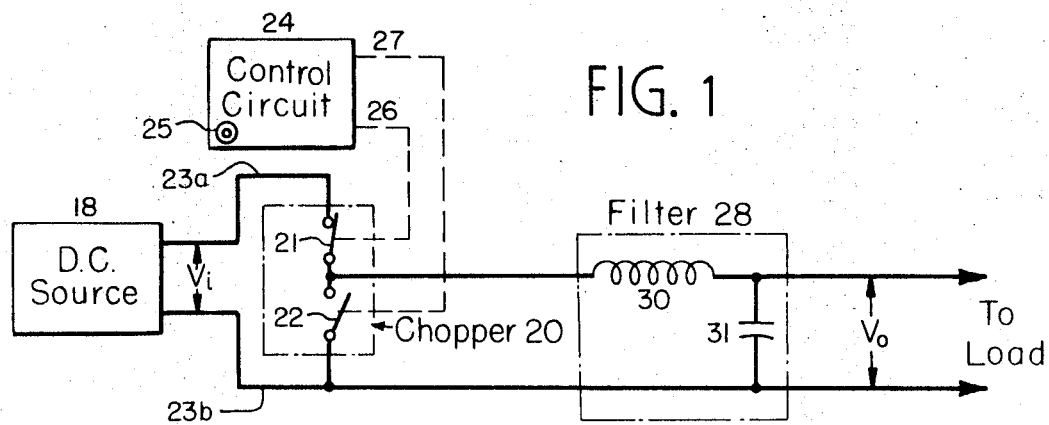
FIG. 1 is a block diagram, partly in schematic form, of a high power DC-to-DC converter useful for practicing the invention.

FIG. 1 shows a chopper or converter 20 which includes a pair of switches 21, 22. For illustrative purposes these switches are depicted as mechanical units, but those skilled in the art will appreciate that in general the switches may be semiconductor units such as transistors, power transistors, or silicon controlled rectifiers. A DC source 18 is connected to supply a voltage $V_i$ over input conductors 23a, 23b to chopper 20. A battery, fuel cell, rectifier circuit or other energy source can provide the energy for application over conductors 23a and 23b to the chopper. A control circuit 24 includes an adjusting means 25 for regulating the timing and the duration of control signals applied over lines 26 and 27 to the switches 21, 22, respectively. Lines 26, 27 are depicted as mechanical linkages to close the mechanical switches 21, 22 but of course in a conventional circuit these lines represent the electrical conductors which pass the gating signals to the base or gate of the semiconductor unit.

A filter 28 is coupled between the output circuit of chopper 20 and the load to smooth the output voltage $V_o$ passed to the load. As shown the filter comprises an inductor 30 coupled in series with one of the load conductors, and a capacitor 31 connected across the two load conductors to filter the output voltage. The voltage $V_o$ is equal to the average output voltage of the chopper circuit 20, neglecting the series resistance of the filter.

The switches 21, 22 are connected such that when one switch is opened, the other switch is always closed. Thus when switch 21 is closed the full input voltage $V_1$ is applied to the chopper and when switch 21 is opened this voltage application is interrupted. Switch 22 provides a DC connection between the choke and the input circuit during the off dwell time of the chopper. Such a connection obviates high voltage levels which would otherwise occur with the large change in current over a very small time span if switch 21 were opened without providing some other DC path. Of course a diode could be employed in place of switch 22 but generally a semiconductor switch is utilized in this position and thus this arrangement has been selected to depict the basic chopper operation.

Figure 2:
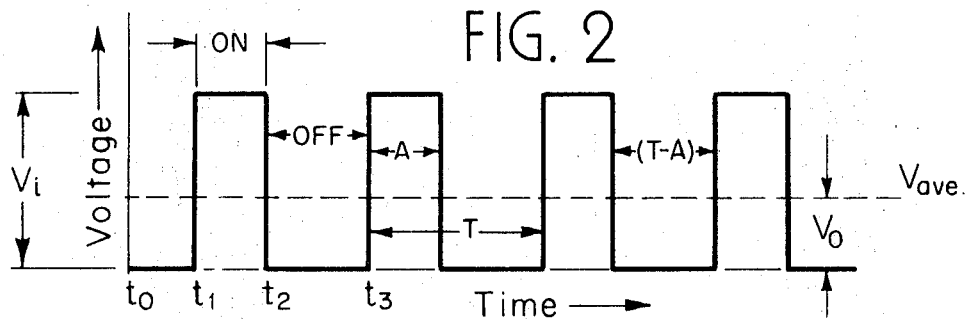
FIGS. 2 and 3 are propaedeutic illustrations useful in understanding chopper operation.

FIG. 2 illustrates, with an idealized waveform, the operation of the chopper circuit. The input voltage level $V_1$ is shown at the left side, on the ordinate scale. At time $t_0$ the system is at rest, and at time $t_1$ switch 21 closes and the applied voltage passed to the filter goes to the maximum level. At time $t_2$ switch 21 is opened and switch 22 is simultaneously closed, so that the applied voltage decreases to zero. Thus the time interval between $t_1$ and $t_2$ denotes the pulse width or the "on" dwell time of the chopper, which time is also referenced by A to facilitate discussion hereafter. The chopper remains in this same condition until time $t_3$ when, under the impetus of the signals applied over lines 26, 27, switch 21 is again closed and switch 22 is opened. Thus this time period between $t_2$ and $t_3$ is the "off" dwell time of the chopper. The total time period including the sum of the on and off times is denoted T, both in FIG. 2 and hereafter in this explanation. Accordingly the off dwell time is equal to $(T-A)$.

With the chopper operating as shown in FIG. 2, the average output voltage $V_{ave}$ is depicted by the dashed line, being equal to $V_o$. This value is equal to $$\frac{A}{T} V_i$$

The better to portray the advantages achieved by construction and operation of this invention, previous chopper or converter systems and their attendant disadvantages will be described. In large measure the significant difference between the system of this invention and previous chopper arrangements resides in the control circuit which regulates timing of the switching signals applied to the chopper. A preferred circuit for deriving and applying the switching signals will be described hereinafter. A different nomenclature has been applied to the various known systems and methods for providing and applying the timing signals to the chopper. Each of these methods for systems constitutes a somewhat different arrangement which has it own distinctive characteristics. In describing and comparing these various systems, consideration will be given to the minimum on and off dwell times of the chopper, the maximum operating frequency of the chopper, the range of the average chopper output voltage $V_o$, and to the physical size of the choke or inductor employed in the filter. For simplicity of explanation the average chopper output voltage $V_o$ will b econsidered to be symmetrical about a value of $0.5V_i$ throughout the description; for example, $0.1V_i$ to $0.9V_i$, $0.3V_i$ to $0.7V_i$, and so forth.

Because a primary consideration of this invention is the provision of a chopper control system in which the physical size of the inductor in the filter is minimized for a certain output voltage range, considering the maximum operating frequency $f_{max}$ and the mniimum pulse-width A of the chopper, it will be helpful to have a general expression for the voltage-time integral of the filter choke. Such an expression can readily be evaluated and provide an index of the physical size of the filter choke. By integrating the instantaneous value of the voltage appearing across the choke with respect to time, from the start of the period T until the termination of the on time A, or integrating from the end of the on time A to the expiration of the period T, the result is:

$$V_i \left[ A - \frac{A^2}{T} \right] \quad (1)$$

Because the filter choke must be sized to withstand the maximum value of the volt-time integral obtained by Equation 1, the maximum value of this expression will be significant during the following explanation.

PULSE-WIDTH MODULATION

Figure 3A:
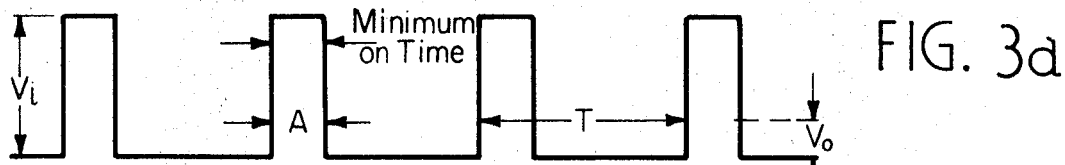

In the pulse-width modulation system for chopper control the operating frequency $f$, and thus the period T, remain fixed, and the on dwell time A of the chopper is varied to provide control of the amplitude of the output voltage $V_o$. This operation is shown in FIG. 3 wherein the on dwell time A is gradually varied from a minimum value to a maximum value. The minimum on time A is shown in FIG. 3a and the minimum off time $(T-A)$ is shown in FIG. 3d. These minimum values are limitations which are determined primarily by the chopper components. Each semiconductor switch has limitations as to turn-on and turn-off times, and this imposes limitations on the system, resulting in the minimum on and off dwell times represented in FIG. 3.

Once the maximum frequency of the chopper, and the minimum on and off dwell times are determined, the maximum range of the average output voltage $V_o$ of the chopper (for example, $0.2V_i$ to $0.8V_i$) and the maximum value of the volt-time integral applied to the filter choke are established. As the pulse-width or the on dwell time A changes, the ratio $A/T$ likewise changes, and the value of the volt-time integral given by Equation 1 changes. These changes in the values of A and $T-A$ are readily discernible in FIG. 3, but for a better understanding of the resultant changes in the value of the volt-time integral, reference is now made to FIG. 4.

Figure 4:
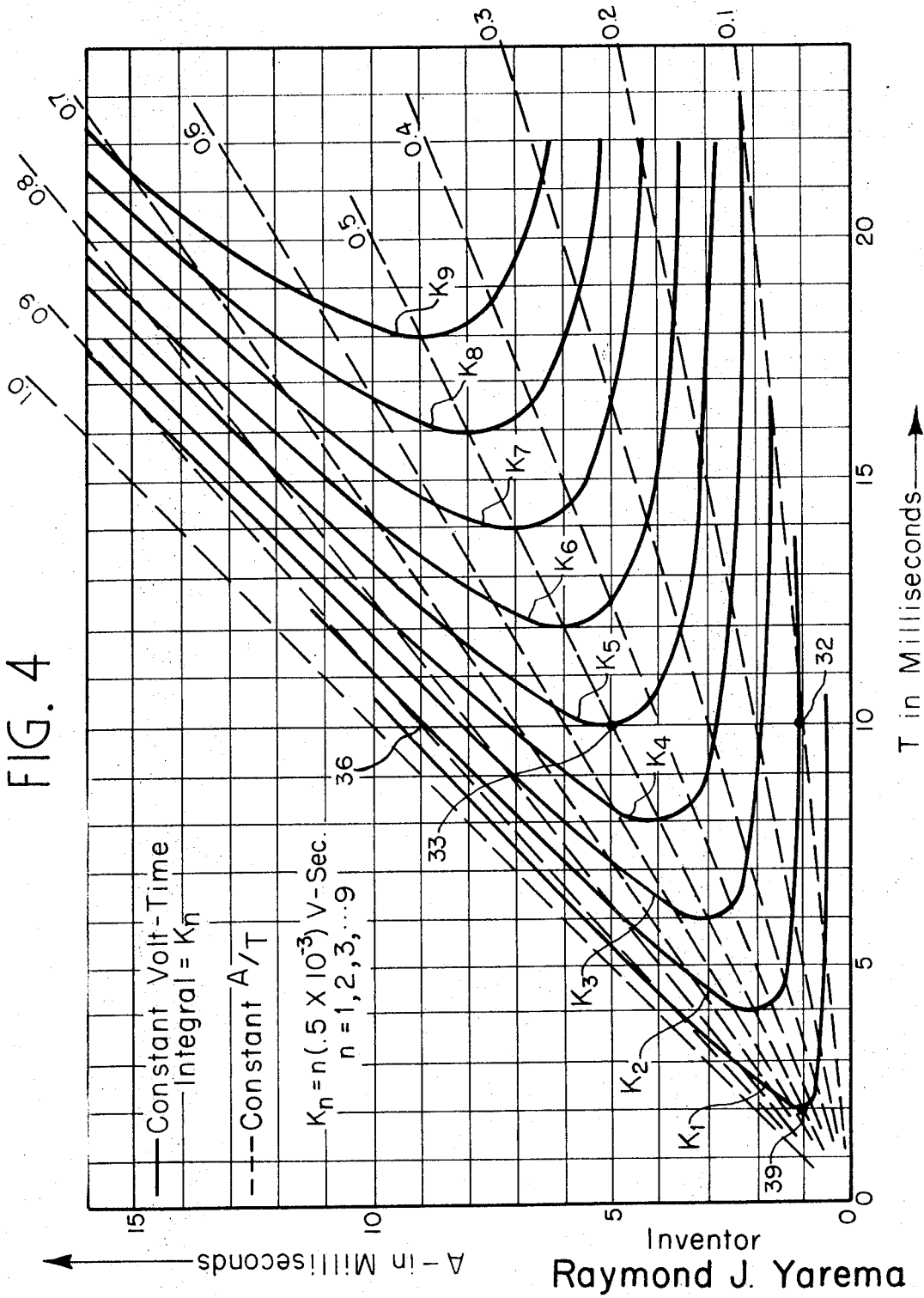

In FIG. 4 the values of T, the complete period of operation of the chopper, are plotted in milliseconds along the abcissa. The values of A, the time duration of the on cycle of the chopper, are plotted along the ordinate in milliseconds. A family of nine solid-line curves $K_1-K_9$ of parabolic form are plotted for different values of constant volt-time integral, or constant physical size of the choke. Another family of curves is illustrated in broken line form, each being a straight line, plotted to represent constant values of $A/T$. In the pulse-width modulation system, T is maintained constant and A is varied. Accordingly in the illustration of FIG. 4, as the value of the average output voltage $V_o$ is changed, the required combinations of A and T are found along a straight vertical line of constant T and variable A.

By way of example suppose that the maximum frequency $f_{max}$ of the chopper were 200 hertz, the minimum value of T were 1 millisecond, and that a 9:1 voltage range ($0.1V_i$ to $0.9V_i$) were desired. For the lower limit of this voltage range, A equals 1 millisecond and T equals 10 milliseconds; for this point 32 the corresponding value of the volt-time integral lies between $K_1$ and $K_2$. As the on time A increases, the value of $A/T$ similarly increases. At the mid-point of the voltage range, point 33, where $A/T$ equals one-half, the value of the corresponding volt-time integral is $K_5$. Thereafter the value of the volt-time integral decreases as the value of $A/T$ increases beyond ½.

FIG. 5 illustrates three different curves each depicting the results achieved with a different technique of modulation. Along the abcissa scale the output voltage $V_o$ is depicted as a percentage of the input voltage $V_i$. On the ordinate scale the relative value of the volt-time integral, or absolute magnitude of the filter choke required, is represented. It will become apparent that operation over an output voltage range is represented by a volt-time curve such as one of the three solid line curves depicted in FIG. 5. The maximum value of such a curve is of interest because it denotes the maximum value of the volt-time integral and therefore determines the size of the filter choke required for such a system. Curve 34 illustrates the values of the volt-time integral as a function of the average output voltage $V_o$ of the chopper when pulse-width modulation is utilized. It is noted that the maximum value of the volt-time integral for this system occurs at point 35 where $A/T$ equals ½.

There are several disadvantages inherent in the pulse-width modulation system. To reduce the maximum value of the volt-time integral or the maximum physical size of the choke (equivalent to passing through curves of smaller K values on FIG. 4), it is necessary to decrease the length of the period T. This however increases the operating frequency of the chopper and decreases the available range of the average output voltage $V_o$, neither of which effects is desirable. To increase the average output voltage $V_o$ it is necessary to increase T. However this in turn results in a larger value for the maximum volt-time integral, or a larger physical dimension for the choke in the filter. Accordingly it is manifestly difficult to observe the limitations of the chopper in the pulse-width modulation system, to maintain a relatively small volt-time integral and still obtain the desired voltage range of the output voltage $V_o$.

CONSTANT PULSE-WIDTH, VARIABLE-FREQUENCY MODULATION

FIG. 6 illustrates variations in the chopper waveforms for the constant pulse-width, variable-frequency modulation system as the on dwell time A of the chopper is held constant and the frequency or period T of the chopper is varied. The output voltage $V_o$ from the chopper can thus be varied as shown in this illustration. Considering again the families of curves shown in FIG. 4, operation of the constant pulse-width, variable-frequency modulation system results in movement along a horizontal line, for which A has a constant value, as the value of T is varied. To correlate this system with the one just described, again the chopper operation is considered wherein the maximum frequency equals 200 hertz, minimum time T equals 1 millisecond, and a 9:1 voltage range is desired. To produce an output voltage $V_o$ equal to $0.9V_i$, operation at the point referenced 36 in FIG. 4 is indicated, where A equals 9 milliseconds and T equals 10 milliseconds. At point 36 the value of the volt-time integral, and thus the physical size of the choke, lies between the curves $K_1$ and $K_2$. As the output voltage $V_o$ is decreased from $0.9V_i$ to $0.1V_i$ (by holding the value of A constant and increasing the value of T), the corresponding value of the volt-time integral continues to increase. Curve 37 in FIG. 5 depicts a plot of the volt-time integral value against the average output voltage $V_o$ for the fixed pulse-width, variable frequency modulation system. It is particularly noted that the volt-time integral increases linearly as the average chopper output voltage $V_o$ is decreased.

There are two major disadvantages with this second system. First, to obtain the desired voltage $V_o$ at the lower end of the output voltage range, it is generally true that large values of the volt-time integral must be applied to the filter choke. Thus the choke must be greatly oversized to meet the lower output voltage requirement. Second, to obtain average output voltage values approaching $V_i$, the minimum off dwell time $(T-A)$ must be small, or else the period T must be large, which requires that still larger volt-time integral values must be applied to the filter choke at the lower end of the voltage range.

IMPROVED SYSTEM

Maximum chopper frequency at $V_o=½V_i$

The control circuit of this invention, to be described hereinafter, can be used to regulate variation of both the pulse-width A and the frequency (and thus the period T) to achieve optimum system operation with a minimum physical size of the choke. For this operation it is initially assumed that the maximum operating frequency $f_{max}$ of the chopper is limited only by the minimum pulse-width A of the chopper. The chopper is controlled such that the middle of the output voltage range, where $V_o$ equals one-half $V_i$, is established at the point where the maximum chopper operating frequency occurs. This can be accomplished, by way of example, by producing a portion of the output voltage range of $V_o$ with the on dwell time A of the chopper held constant and the frequency varied, and producing the remainder of the voltage range $V_o$ by maintaining the off dwell time $(T-A)$ fixed and varying the frequency of the chopper. Such operation is illustrated by the waveforms depicted in FIGS. 7a–7g, inclusive. To obtain an output voltage $V_o$ of $0.5V_i$, the value of $A/T$ is equal to ½, and the chopper is operating at its maximum frequency $f_5$ as shown in FIG. 7d. In this explanation subscripts of higher value denote frequencies of greater magnitude; for example, $f_5$ is higher than $f_4$. To decrease the average chopper output voltage below the $0.5V_i$ value, the chopper frequency is gradually decreased through the frequencies $f_4$, $f_2$ and $f_1$ as shown in the waveforms of FIGS. 7c, 7b and 7a. In this decrease of the output voltage $V_o$ the on or dwell time A of the chopper is held constant as the frequency of the chopper operation is decreased.

Conversely to increase the output voltage $V_o$ above the level of $0.5V_i$, the off dwell time $(T-A)$ is held fixed and the frequency of the chopper is varied as shown successively in FIGS. 7e, 7f and 7g. The frequencies are again designated $f_4$, $f_2$ and $f_1$, representing frequency values successively less than the maximum frequency $f_5$ shown in FIG. 7d. The better to illustrate the result of this system operation, reference is again made to FIG. 4.

It is assumed that $f_{max}$ equals 200 hertz, minimum time T equals 1 millisecond, and a 9:1 voltage range is desired. When the chopper output voltage $V_o$ is half the input voltage $V_i$, the on dwell time A is equal to ½ of T. At point 39 in FIG. 4, by way of example, A is equal to half of T. To reduce the output voltage $V_o$ below this level, A is held constant and T is increased as shown in FIGS. 7c, 7b and 7a. In FIG. 4 this corresponds to movement from point 39 along a horizontal line to the right. It is manifest from Equation 1 that for values of output voltage $V_o$ decreasing below $0.5V_i$, the value of the volt-time integral increases. To increase the output voltage V above $0.5V_i$, as shown in FIGS. 7e, 7f and 7g, the off dwell time $(T-A)$ is held constant and T is increased. In FIG. 4 this voltage increase would be indicated by a diagonal line extending from point 39 upwardly to the right along a line whose slope is greater than the 0.5 constant $A/T$ line, toward the upper right hand corner of the graph across the curves of increasing K values. The value of the volt-time integral also increases under these conditions for values of $V_o$ greater than $0.5V_i$. This increase of the value of the volt-time integral is shown by curve 38 in FIG. 5. The initial downwardly-sloping (relative to the horizontal axis) portion of curve 38 signifies a gradually decreasing value of the volt-time integral as the output voltage $V_o$ goes from $0.1V_i$ to $0.5V_i$, with the lowest value of the curve occurring in the middle of the voltage output range. The value of the volt-time integral thereafter gradually increases as shown by the upwardly-sloping right hand portion of curve 38, in the output voltage range of $0.5V_i$ to $0.9V_i$. Thus a characteristic V-shaped volt-time integral curve 38 is obtained with the variable pulse-width, variable frequency modulation system.

This system has several desirable features. In the first place the last described system readily provides a virtually unlimited range of output voltage $V_o$. By increasing the period T shown in FIG. 7a, the output voltage $V_o$ of the chopper can be reduced to nearly zero. Likewise by increasing the period T shown in FIG. 7g the output voltage $V_o$ can be increased to approximately the full input voltage $V_i$. The minimum chopper pulse width and filter choke size considerations do not impose a stringent limitation on the maximum voltage range which can be achieved with the variable pulse-width, variable frequency system and this is a significant advantage over the earlier described systems.

In the second place the magnitude of the volt-time integral applied to the filter choke in the variable pulse-width, variable frequency system represents another important advantage. As noted above it was assumed that the chopper can operate up to a frequency $f_{max}$ limited solely by the minimum pulse-width A of the chopper. This point of maximum frequency corresponds to operation at the middle of the output voltage range as shown in FIG. 7d, and from inspection it is apparent that:

$$f_{max} = 1/2T_{min} \qquad (2)$$

The better to illustrate the advantage of the value of the volt-time integral realized with this system, a typical set of conditions will be considered. It is assumed that the maximum value of the output voltage $V_o$ is required to be $0.9V_i$. To provide this output voltage with the smallest value of the volt-time integral, the waveform of the chopper voltage is identical for all the three described chopper modulation systems. Note the constant frequency chopper operation shown in FIG. 3d; the constant pulse-width operation depicted in FIG. 6d; and the variable pulse-width, variable frequency operation illustrated in FIG. 7g. Accordingly the volt-time integral applied to the filter choke for each of these modulation arrangements is identical at the point where $V_o$ equals $0.9V_i$, and this point is designated 40 in FIG. 5.

Figure 3B:
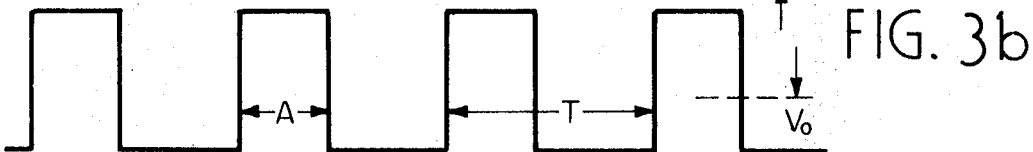
Figure 3C:
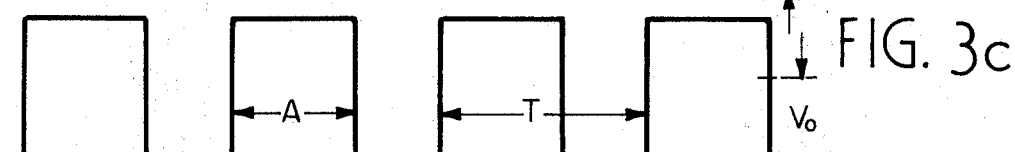
Figure 3D:
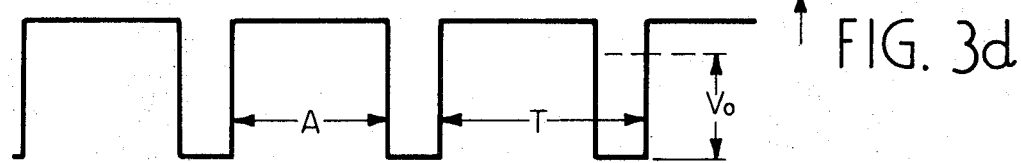

Note, however, that for the pulse-width modulation arrangement described in connection with FIG. 3, as A is gradually decreased as shown in FIGS. 3c, 3b and 3a, the value of the volt-time integral increases as shown by curve 34 toward a maximum value at point 35, the mid-range point of the chopper output voltage level. Again, for the variable frequency modulation system described in connection with FIG. 6, as the frequency is gradually decreased to decrease the output voltage level as shown in FIGS. 6c, 6b and 6a, the value of the volt-time integral likewise increases as represented by curve 37 in FIG. 5. In contradistinction to the volt-time integral values for these two systems, curve 38 denotes that the volt-time integral gradually decreases for the variable pulse-width, variable frequency system as the output voltage $V_o$ decreases from the maximum value at point 40. Even though the value of the volt-time integral again increases over the lower voltage range of the chopper, as shown by the left side of curve 38, the value of the volt-time integral never exceeds the value established at point 40 representing the other end of the range of output voltage, where the values of the volt-time integral for all three systems are the same. The earlier-described systems both increase the value of the volt-time integral substantially above the level at point 40 as the chopper output voltage level is decreased. Therefore each of the variable pulse-width and constant pulse-width, variable frequency systems has a peak value of the volt-time integral substantially larger than the peak value in the variable pulse-width, variable frequency modulation system. This graphic explanation of the advantages of the third system is readily confirmed by quantitative analysis of Equation 1 given above for each of the three modulation systems.

In the subsequent discussion the fixed pulse-width, variable frequency system described in connection with FIG. 6 and shown by the curve 37 in FIG. 5 will be dropped from consideration. Referring to FIGS. 3d and 6d, for which the values of A, T and $T_{min}$ are assumed identical, the volt-time integral values for the two systems are the same at $0.9V_i$, represented by point 40 in FIG. 5. To reduce the output voltage $V_o$ to $0.5V_i$ with the pulse-width modulation arrangement, the period T is held fixed and the on dwell time A is reduced to provide the maximum value of the volt-time integral at point 35 as shown in FIG. 5, where the output voltage is equal to $0.5V_i$. However with the fixed pulse-width, variable frequency modulation system the value of the volt-time integral constantly increases, as depicted by curve 37, as the value of the output voltage decreases, with an increase in the period T as the on dwell time A is held constant. By evaluation for the corresponding values for the volt-time integral expression given in Equation 1, it is demonstrable that under any conditions the pulse-width modulation technique always has a smaller peak value of the volt-time integral. Accordingly the fixed pulse-width or fixed on dwell time A, variable frequency modulation system described in connection with FIG. 6 and represented by the curve 37 in FIG. 5 will no longer be considered.

HYBRID MODULATION SYSTEM

Improvement of the variable pulse-width, variable frequency system

It was assumed in describing the variable pulse-width, variable frequency system in connection with FIG. 7 that the only limitation on the maximum operating frequency of the chopper was the minimum chopper pulse-width A, in accordance with Equation 2. In actual practice however these theoretical limitations are not necessarily the true limitations on the system. A chopper used in high power applications may not be capable of operating at a frequency as high as that indicated by Equation 2 for various reasons, such as over-heating of the components in the chopper. In other words as a practical matter the true limitation on the maximum operating frequency $f_{max}$ of the chopper is not equal to the reciprocal of twice $T_{min}$ as indicated in Equation 2, but the maximum operating frequency is lower than this theoretical value. It is thus important to this invention to provide a control system which enhances system operation such that the chopper is operated in a more efficient manner than is possible with the variable pulse-width, variable frequency system, and this operation is termed the hybrid modulation system. This hybrid system assures that the advantage of reduction in the volt-time integral value is obtainable even when the maximum operating frequency of the chopper is less than $1/2T_{min}$.

Even though these practical considerations may impose some limitation on the maximum operating frequency of the chopper, nevertheless the variable pulse-width, variable frequency modulation system described above manifestly exhibits an advantageous volt-time integral characteristic curve (38, FIG. 5) in the region where the chopper operating frequency is below its maximum value. Another way of viewing this frequency reduction is in connection with FIGS. 7a–7g. If it is assumed that the chopper cannot operate at the maximum frequency $f_5$ indicated in FIG. 7d, the chopper can still operate at the considerably lower frequencies $f_4$, $f_2$ and $f_1$ shown in this figure. With continued operation at the lower frequencies, the volt-time integral curve 38 is still correct for the upper (maximum $V_o$) and lower (minimum $V_o$) portions of the output voltage range, but is no longer valid for the center portion near the value of $0.5V_i$.

With the control circuit of this invention, effective control over the entire range can still be achieved at the lower maximum frequency by utilizing pulse-width modulation at the maximum operating frequency of the chopper. Waveforms illustrating this operation are set out in FIGS. 8a–8h. Note that the lower portion of the output voltage range is still achieved by operation similar to that of the system described in connection with FIG. 7. In FIGS. 8a and 8b, at the lower frequencies $f_1$ and $f_2$, the minimum pulse-width A is maintained and the period T is gradually reduced ($T_1$, $T_2$) to correspondingly effect the gradual increase in the output voltage $V_o$. To enhance the chopper operation with the hybrid system, at frequency $f_3$ pulse-width modulation is utilized to effect regulation of the amplitude of $V_o$ over the central portion of the output voltage range at one constant frequency $f_3$, or one constant period $T_3$, as depicted in FIGS. 8c–8f. Thereafter, at the upper end of the output voltage range as shown in FIGS. 8g and 8h, the minimum off dwell time $(T-A)$ is maintained constant as the frequency is thereafter reduced, and T is increased, to approach the maximum voltage $V_o$ of the chopper.

Referring again to FIG. 4, the just-described hybrid operation with pulse-width modulation at the maximum chopper frequency will result in a different "movement" of the value of the volt-time integral in this graph. With respect to FIGS. 8a and 8b, as the frequency is gradually increased with the on dwell time A maintained constant, this is represented in FIG. 4 by movement from right to left along a horizontal line as T is reduced and A is maintained constant. When the maximum chopper frequency is reached, movement to the left along the horizontal line in FIG. 4 ceases. Then, as shown in FIGS. 8c–8f, the frequency remains constant, T remains constant, and A is gradually increased to provide regulation of $V_o$ over the central portion of the chopper output voltage range. In FIG. 4 this corresponds to movement along a vertical line upwardly as the middle frequency is maintained constant. Thereafter as depicted in FIGS. 8g and 8h, the off dwell time $(T-A)$ is maintained constant while A and T are gradually increased with decreasing frequency to approach the maximum value of output voltage $V_o$. In FIG. 4 this corresponds to movement upwardly and to the right along a diagonal line. Those skilled in the art will appreciate that this movement along three straight lines, first the horizontal line to the left, then a vertical line upwardly, and then another straight line upwardly to the right, is a rough approximation of a constant volt-time integral curve such as the series of curves shown in solid lines in the drawing. The more closely these curves can be approximated, the more nearly does the actual physical size of the choke required for the filter correspond to the minimum size that can be effectively used for a chopper when all the system parameters and operating conditions are considered.

FIG. 9 depicts three different volt-time integral curves for the hybrid modulation arrangement just described. Curve ABC is identical to the variable pulse-width, variable frequency modulation curve 38 showing n FIG. 5, and the broken line curve 34 represents the pulse-width modulation values consonant with the showing in FIG. 5. If the theoretical maximum operating frequency were $f_{max}=1/2T_{min}$, the system could operate in the variable pulse-width, variable frequency modulation mode along the curve ABC. Assuming that a lesser value of the maximum chopper frequency $f_{max\,1}$ is the practical limitation on the system, the value of the volt-time integral is depicted in FIG. 9 by the curve which extends between points A and D, with pulse-width A held constant and T decreasing as shown in FIGS. 8a and 8b; over the pulse-width modulation portion 41 to point E, as T is held constant and A is increased (FIGS. 8c–8f); and from point E to point C, with $(T-A)$ held constant and both A and T increasing as shown in FIGS. 8g and 8h. Similarly if the limitation on the maximum operating frequency is reduced further to the value of $f_{max\,2}$, the value of the volt-time integral is depicted by the curve A–F–42–G–C. A still further frequency decrease, to $f_{max\,3}$ for the maximum chopper operating frequency, results in a volt-time integral value ranging over the curve A–H–43–J–C. Thus the initial and terminal portions of the volt-time integral curve for the hybrid modulation system vary along the generally V-shaped curve characteristic of the variable pulse-width, variable frequency modulation curve 38, and the central portions 41–43 of each of the hybrid modulation curves vary in a manner similar to the characteristic 34 of the pulse-width modulation system.

Manifestly the hybrid operation system represents a substantial advance over the pulse-width modulation system. Note for example that reducing the maximum operating frequency of the chopper from $f_{max}$ to $f_{max\,1}$ provides a resultant curve in which the central portion 41 does not exceed the higher values at points A and C of the volt-time integral characteristic curve. In the limiting situation where the limitation of the maximum chopper operating frequency approaches lower and lower values, the characteristic curve for the hybrid system approaches that of the pulse-width curve 34. In the range of practical chopper operating frequencies and the desired range of output voltage $V_o$, the hybrid modulation system has proved the most effective by reason of limiting the volt-time integral value, and thus the physical size and cost of the choke, provided in the filter.

A main consideration of the present invention is to provide a control system which minimizes the physical size of the filter choke, analogous to the smallest value of the peak volt-time integral, for a given range of the output voltage $V_o$. By way of example, the system characteristic for the $f_{max\,2}$ curve A–F–42–G–C shown in FIG. 9 will be considered, and this curve is reproduced in FIG. 10. It is noted that the peak value of the volt-time integral curves occurs at the midpoint of the output voltage range, at a value equal to $0.5V_i$. Accordingly if the system operates such that for other values of the output voltage $V_o$, the level of the volt-time integral does not exceed this amplitude at the point $0.5V_i$, then operation of the system will still be acceptable. In other words, of the broken line 45 in FIG. 10 is taken as the limiting condition, any modification of the chopper modulation method which still produces a volt-time integral curve of an amplitude not exceeding that of curve 45 will still permit chopper operation with the same size filter choke. If the volt-time integral curve is varied, as shown by either of the broken line curves 46 and 47 in FIG. 10, this operation would still be acceptable. These curves 46, 47 could in fact be produced by concomitant variation of both the pulse-width A and the period T over the entire range of output voltage $V_o$, in a manner illustrated in FIGS. 11a–11g. Operation such as that represented by the waveforms of FIG. 11 produces combinations of A and T, on the graphical representation of FIG. 4, which defines a path tending to follow more closely the parabolic constant volt-time integral curves $K_1$–$K_3$. To vary the amplitude of the output voltage $V_o$ from some given output voltage corresponding to a certain point $A_1$, $T_1$ on FIG. 4 to some different output voltage $V_o$ represented by a second point $A_2$, $T_2$, the selected combinations of A and T define a curve which does not cross any of the constant volt-time integral curves $K_1$–$K_9$ of a value larger than the value associated with either of the points $A_1$, $T_1$ and $A_2$, $T_2$. It is again emphasized that these two points have been initially selected to provide the smallest volt-time integral value possible, thus minimizing the physical size (and cost) of the filter choke.

FIG. 12 is a pictorial representation of the operating advantages achieved by the present invention with the hybrid modulation system. In an illustrative example let $T_{min}$ equal 1 millisecond $f_{max}$ equal 200 hertz, and let a 9:1 voltage range be produced. The curve 37 shows the smallest value possible for the volt-time integral for the fixed pulse-width, variable frequency modulation system. Curve 34 depicts the minimum value obtainable for the volt-time integral value characteristic in the variable pulse-width, constant frequency modulation system. The variable pulse-width, variable frequency modulation arrangement produces a range of values depicted by curve 52. In accordance with the inventive teaching the hybrid modulation system provides a volt-time integral characteristic curve always below the line 53 which corresponds to one of the solid line curves in FIG. 4. The actual value of the curve may lie anywhere in the shaded area 54. Shown in broken line 55 is a typical volt-time integral curve in the hybrid modulation range obtained when A is varied continuously as shown in FIG. 11. The solid line curve 56 shows the hybrid modulation technique in which the system is first operated with a decreasing T as shown in FIGS. 8a, 8b. At the maximum frequency T is held constant and A is varied as shown in FIGS. 8c–8f, and thereafter $(T-A)$ is held constant as A and T are gradually increased to the upper limit of the output voltage $V_o$. It is thus manifest that the minimum physical size of the filter choke for the given range of output voltage $V_o$ is obtained with the hybrid modulation system.

DESCRIPTION OF CONTROL CIRCUIT 24

In FIG. 1 control circuit 24 is represented generally as an adjustable unit for passing control signals over lines 26, 27 to regulate operation of the chopper switches 21, 22. To operate in the hybrid modulation mode described above, control circuit 24 constructed in accordance with this invention will now be described.

Figure 13:
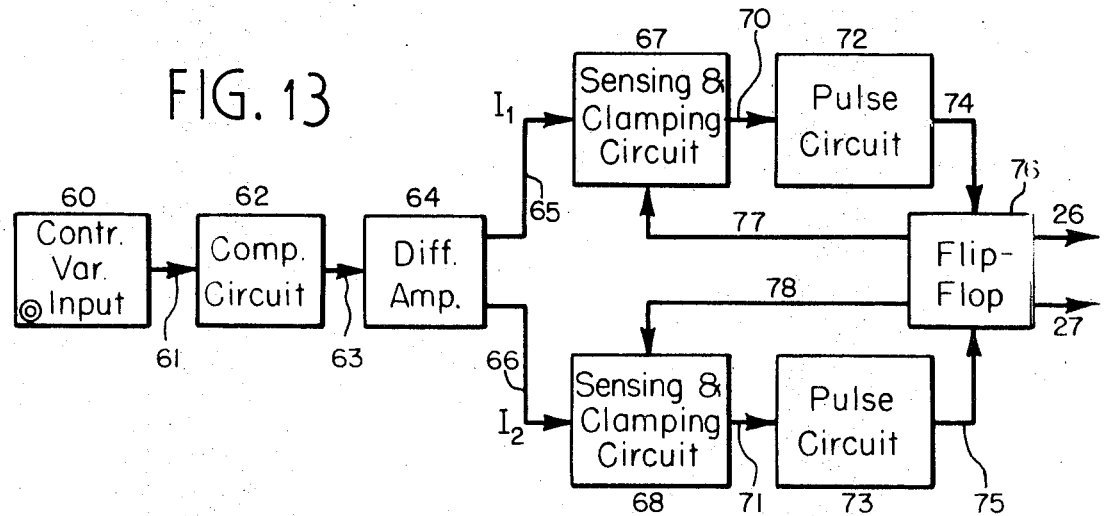
FIG. 13 is a block diagram of a preferred control circuit for practicing this invention.

FIG. 13 depicts in block form the general circuits of the complete control circuit system of this invention. In unit 60 is any suitable circuit for generating a controlled, variable input signal for application over line 61 to compensating circuit 62. In turn the output signal from circuit 62 is passed over line 63 to a difference amplifier 64, which provides first and second control signals designated $I_1$ and $I_2$. These two control signals are applied over lines 65 and 66 to a pair of stages 67, 68 each of which includes sensing and clamping circuits. The outputs from these two stages are respectively applied over lines 70, 71 to a pair of pulse circuits 72, 73, which in turn apply their output signals over lines 74, 75 to a flip-flop or multivibrator stage 76. The state of the flip-flop 76 at any time is denoted by signals fed back from stage 76 over lines 77 and 78 to the respective sensing and clamping circuit 67, 68. A timing signal from the flip-flop stage is passed over lines 26, 27 to provide signals for firing the semiconductor switches in a chopper circuit, thus to provide regulation of the chopper on time and chopper off time.

The more detailed description of the control circuit shown generally in FIG. 13 is conveniently divisable into two portions. The initial description will include the input portion of the circuit, from the receipt or provision of the adjustable control signal in stage 60, to the generation of the two difference signals $I_1$ and $I_2$. Details of this portion of the circuit are depicted in FIG. 14.

Figure 14:
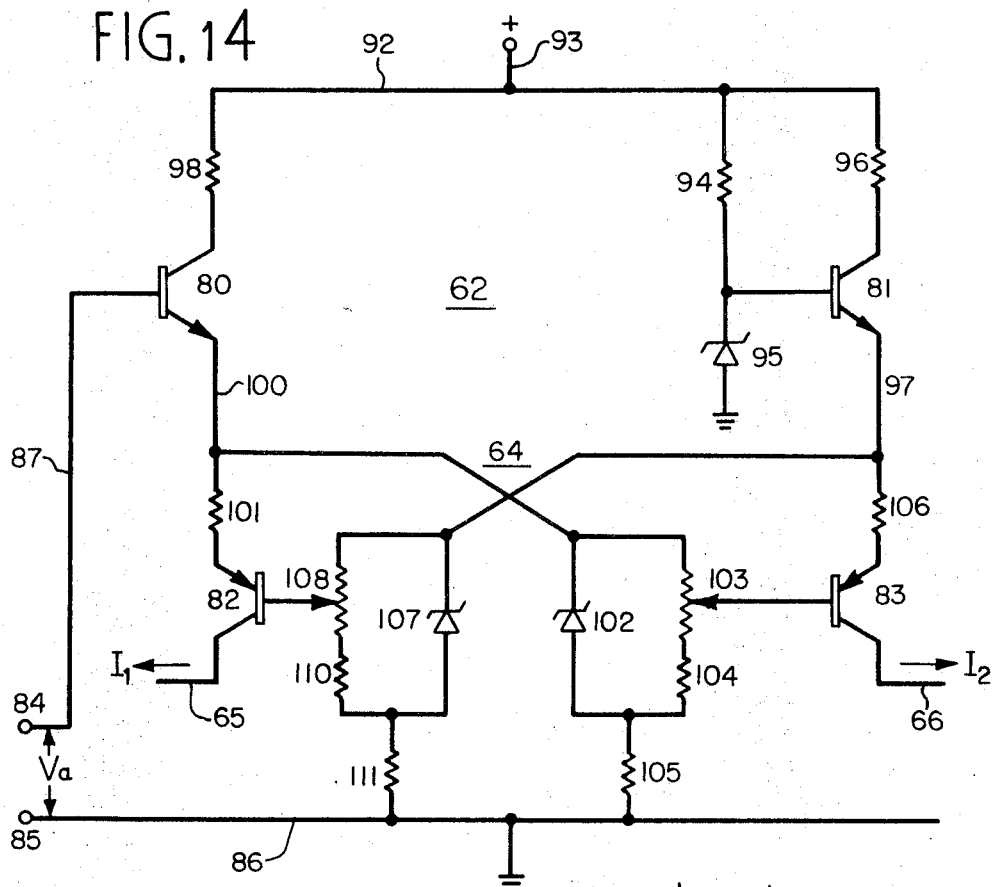

The compensating circuit is in the upper portion of FIG. 14 and includes a pair of NPN type transistors 80 and 81. The lower portion of FIG. 14 includes the difference amplifier with output conductors 65, 66 for passing signals $I_1$ and $I_2$ to the sensing and clamping circuits. A pair of PNP type transistors 82, 83 are included in the difference amplifier. Those skilled in the art will appreciate that the specific components illustrated are by way of illustrating actual operation of a preferred embodiment. Transistors of one type can readily be replaced by transistors of the opposite type, with the accompanying polarity reversal of the supply voltages and the signals.

A pair of input terminals 84, 85 are provided in FIG. 14, and terminal 85 is connected to ground conductor 86. Terminal 84 is coupled over conductor 87 to the base of transistor 80. The circuit of FIG. 14 is energized by applying a suitable unidirectional potential difference between terminal 93 and ground conductor 86, with the polarity at conductor 92 being positive relative to the ground conductor.

An input signal designated $V_a$ is applied between terminals 84, 85, and thus this signal is applied to the base of transistor 80. Such input signal could also be obtained by suitable current adjusting means, for example, by a potentiometer. A reference voltage is established at the common connection between resistor 94 and a Zener diode 95, which circuit is coupled between conductor 92 and ground. The base of transistor 81 is coupled to the connection between resistor 94 and diode 95, and the collector of this transistor is coupled through a resistor 96 to conductor 92. The emitter of this transistor is coupled over a conductor 97 to the difference amplifier. Transistor 81 and its associated circuit provide compensation for changes in the base-emitter voltage drop from transistor 80 which may occur by reason of temperature variation.

The collector of transistor 80 is coupled through a resistor 98 to conductor 92. Transistor 80 essentially functions as an input resistor which limits loading of the input signal by the difference amplifier circuit. The base-emitter junctions of transistors 80, 81 are forward biased and their base-collector junctions are reversed biased. The voltage appearing at the emitter of transistor 80 and passed over conductor 100 to the difference amplified circuit is equal to the input voltage $V_a$ minus the base-emitter voltage drop of transistor 80. Similarly the voltage established on conductor 97 is equal to the reference voltage between resistor 94 and diode 95 minus the base-emitter voltage drop of transistor 81.

A resistor 101 is coupled between conductor 100 and the emitter of transistor 82. Conductor 100 is also coupled to the top of a parallel circuit which includes a Zener diode 102 in one leg, and a potentiometer 103 series-coupled with a resistor 104 in the other leg. A resistor 105 is coupled between the bottom of this parallel circuit and ground conductor 86. The movable arm of potentiometer 103 is coupled to the base of transistor 83, and the emitter of this transistor is coupled over a resistor 106 to conductor 97. Conductor 97 is also coupled to the top of another parallel circuit which includes a Zener diode 107 in one leg and a potentiometer 108 series-coupled with a resistor 110 in the other leg. The bottom of this parallel circuit is coupled through a resistor 111 to ground conductor 86. In the difference amplifier circuit potentiometers 103, 108, resistors 104, 105, 110, 111 and Zener diodes 102, 107 provide adjustable bias voltages for the bases of transistors 82 and 83. The difference amplifier applies a first output signal $I_1$ over conductor 65 to sensing and clamping circuit 67, and the other transistor 83 in the difference amplifier provides an output signal $I_2$ over conductor 66 to the other sensing and clamping circuit 68.

FIG. 15 shows an energizing terminal 112 and a ground conductor 113, which conductor can be connected to ground conductor 86 (FIG. 14) as the same unidirectional potential difference applied to terminal 93 is also applied to terminal 112. The power supply for the circuit of FIG. 15 need not be well regulated but may fluctuate over a considerable range, by reason of the connection of resistor 114 and Zener diode 115 between terminal 112 and ground. The potential on conductor 116 is thus a well-regulated potential, and is positive relative to ground conductor 113. The components shown in FIG. 15 include the sensing and clamping circuits 67, 68, the pulse circuits 72, 73, and the flip-flop 76 shown more generally in FIG. 13. Because the circuit of FIG. 15 is symmetrical, a detailed description of half will suffice for a clear understanding of the entire circuit and its operation.

In the left portion of FIG. 15 is a unijunction transistor 117 having its emitter connection coupled through a resistor 118 to conductor 65, which conductor is also coupled through a capacitor 120 to ground conductor 113. The base-two connection of transistor 117 is coupled through a series circuit including a resistor 121, a diode 122, and another resistor 123 to conductor 116. The common connection between diode 122 and resistor 123 is coupled to the collector of NPN type transistor 124 in the circuit of flip-flop 76, and the emitter of this transistor is coupled directly to ground conductor 113.

The base-one connection of transistor 117 is coupled through a resistor 125 to the ground conductor 113, and both a diode 126 and primary winding 127 of a pulse transformer 128 are coupled in parallel with resistor 125. The secondary winding 130 of the pulse transformer has one side grounded, and the other end of the winding is coupled through a resistor 131 and a diode 132 to the base of transistor 124. A resistor 133 is coupled between the base and emitter of this same transistor, and the common connection between diode 132, resistor 133 and the base of transistor 124 is extended over a conductor 134 to one side of a parallel circuit including resistor 135 and capacitor 136. The other side of this parallel circuit is coupled to output conductor 27, the collector of the other NPN type transistor 137 in flip-flop 76, and through a resistor 138 to conductor 116.

Another parallel circuit comprises a resistor 140 and a capacitor 141, and the left side of this circuit is coupled to output conductor 26, resistor 123, diode 122, and the collector of transistor 124. The right side of parallel circuit 140, 141 is coupled over a conductor 142 to the common connection between a diode 143, a resistor 144, and the base of transistor 137. The other side of resistor 144 is coupled to ground conductor 113, and the other side of diode 143 is coupled through a resistor 145 and secondary winding 146 of pulse transformer 147 to ground. The primary winding 148 of this transformer has one side coupled to ground conductor 113, and diode 150 and resistor 151 are coupled in parallel with primary winding 148. The common connection between this primary winding, diode 150 and resistor 151 is coupled to the base-one connection of another unijunction transistor 152, of which the base-two connection is coupled through a series circuit including a resistor 153 and a diode 154 to the common connection between resistor 138, output conductor 27 and the other illustrated components. The emitter connection of transistor 152 is coupled through a resistor 155 to the common connection between input conductor 66 and a capacitor 156, with the other side of this capacitor being coupled directly to ground conductor 113.

Considering the operation of the circuit in FIG. 15 in general terms, charging current such as $I_1$ received over input conductor 65 charges capacitor 120 and the voltage of this capacitor is applied through resistor 118 to the emitter of transistor 117. A bias voltage for the base-two connection is applied over diode 122 and resistor 121. When the charge accumulated in capacitor 120 is sufficiently high, transistor 117 conducts or fires and a pulse is applied through this unijunction transistor and across the primary winding 127 of pulse transformer 128. As this pulse abruptly ceases to flow through the primary winding, diode 126 clamps the voltage at that level across the primary winding. The pulse is transmitted over secondary winding 130 through resistor 131 and diode 132 to the base of transistor 124 to switch this transistor on and, through parallel circuit 140, 141 and conductor 142, to switch transistor 137 off. Thus the state of flip-flop 76 is changed each time capacitor 120 accumulates a voltage sufficiently high to fire transistor 117 and pass a pulse over transformer 128. Accordingly the output signals from conductors 26, 27 can be utilized to switch the semiconductor units in the chopper, to ultimately control the times of chopper operation and nonoperation.

The operation of the circuits shown in both FIGS. 14 and 15 may be better understood by considering the equivalent circuit diagram of FIG. 16. As there shown a first current generator 160 is connected to provide charging current $I_1$ over conductor 65, and another current generator 161 provides the other charging current $I_2$ over conductor 66. A capacitor $C_1$ is coupled in parallel with a switch $S_1$ between current generator 160 and ground conductor 162. Similarly another capacitor $C_2$ is coupled in parallel with a second switch $S_2$ between current generator 161 and ground conductor 162. The purpose of the equivalent circuit is to generate two timing portions, denoted $t_1$ and $t_2$ in FIG. 17a, each of variable duration, of a timing signal for the hybrid modulation system for controlling the on and off dwell times of the semiconductor switches referenced generally as 21, 22 in FIG. 1. These two semiconductors are always in opposite states, as previously explained. Operation of the equivalent circuit illustrated in FIG. 16 will now be described.

It is initially considered that switch $S_1$ is closed $S_2$ is open as shown in FIG. 16. Accordingly capacitor $C_1$ is effectively short circuited and all of the current $I_1$ from the generator 160 flows through $S_1$. This current is referenced $I_{s1}$ in FIG. 16 and depicted as the waveform in FIG. 17b. Thus at this time there is no charge being accumulated in $C_1$, and the voltage $V_1$ across this capacitor is zero as shown in FIG. 17c. At the same instant switch $S_2$ is open and current $I_2$ from generator 161 is thus linearly charging capacitor $C_2$. The absence of any current flow $I_{s2}$ through switch $S_2$ at this time is indicated by the zero level of the initial portion of the waveform depicted in FIG. 17d, and the linear charge accumulation across capacitor $C_2$ to provide the voltage $V_2$ thereacross is indicated in FIG. 17e, where the voltage rises from zero to a peak value $V_p$.

When the voltage accumulated across $C_2$ reaches the peak value $V_p$, switch $S_2$ closes and switch $S_1$ opens. When switch $S_2$ closes capacitor $C_2$ discharges through $S_2$, as evident in FIG. 17e, and the charging current $I_2$ from generator 161 bypasses capacitor $C_2$ and flows through $S_2$, as shown in FIG. 17d. As switch $S_1$ opens, current $I_{s1}$ no longer flows through the switch (FIG. 17b) but instead begins a linear charge of capacitor $C_1$ to provide voltage $V_1$ thereacross (FIG. 17c). When the voltage across $C_1$ reaches the peak value $V_p$, switch $S_1$ closes and switch $S$ opens. Capacitor $C_1$ then discharges through $S_1$ and the charging current $I_1$ is also bypassed through this closed switch. This cyclical operation continues as indicated in the idealized waveforms of FIGS. 17b–17e. The timing signals referenced $t_1$ and $t_2$ in FIG. 17a corresponds to the respective charging times of capacitors $C_1$ and $C_2$ as is manifest from FIGS. 171c and 17e.

With this explanation of the idealized circuit operation, the operation of difference amplifier 64 shown in FIG. 14 more readily understood. In this schematic diagram, when $V_a$ at terminals 84, 85 equals the reference voltage established at the base of compensating transistor 81, trimmer potentiometers 103, 108 are set so that the voltages applied to the bases of transistors 83 and 82 are equal, and hence $I_1=I_2$. If $V_a$ now increases, such voltage increase appears across resistor 105 and hence the base bias voltage to transistor 83 is increased. The emitter current and thus the collector current of transistor 83 is therefore reduced. At this time, however, the voltage applied to the base of transistor 82 has not changed, $V_a$ has been increased, and thus the emitter and collector currents flowing through transistor 82 increase. The magnitude of this increase in output current $I_1$ is equal to the amount of the decrease in output current $I_2$ from transistor 83, and thus the sum of the currents $I_1$ and $I_2$ has not changed.

In an analogous manner if $V_a$ decreases, the voltage decrease appears across resistor 105 and thus at the base of transistor 83. It follows that the emitter and collector currents of this transistor increase. With the decrease of $V_a$ the emitter and collector currents of transistor 82 decrease. Once again the changes in currents $I_1$ and $I_2$ are equal in magnitude but opposite in direction and thus the sum of the currents $I_1$ and $I_2$ has not changed.

If the level of the input signal $V_a$ becomes sufficiently high, the base-emitter junction of transistor 83 becomes reverse-biased, $I_2$ goes toward zero in magnitude, and the time $t_2$ which is required to charge a capacitor with current $I_2$ approaches infinity. Conversely as the amplitude of the input signal becomes sufficiently low, transistor 82 is cut off, $I_1$ approaches zero level and $t_1$ approaches infinity. From the previous explanation of general chopper considerations, it is apparent that these limiting conditions are related to a chopper output voltave $V_o$ of virtually zero $V_i$, and to the other limiting condition where the chopper output voltage $V_o$ approaches full $V_i$ or the full DC bus voltage applied to the chopper.

In the schematic diagram of FIG. 15, currents $I_1$ and $I_2$ generated in the manner just described flow over conductors 65 and 66 into this circuit. Considering initial conditions wherein transistor 124 of flip-flop 76 is "on" or conducting, the collector of transistor 124 is virtually at ground potential, and hence no bias voltage is applied to the base-two connection of unijunction transistor 117. All of the current $I_1$ is thus flowing through resistor 118, the emitter to base-one junction of transistor 117, and the saturated primary winding 127 of transformer 128. The collector voltage $V_c$ of transistor 124 is shown in FIG. 17f, and the legend $V_x$ denotes the voltage level established by resistor 114 and Zener diode 115.

With transistor 124 on, transistor 137 is "off" or nonconducting and the collector potential $V_c$ of this transistor is approximately $V_x$ as shown in FIG. 17g. A bias voltage is applied to the base-two connection of unijunction transistor 152 through diode 154 and resistor 153 at this time. The emitter to base-one junction of transistor 152 is reverse-biased and thus current $I_2$ is linearly charging capacitor 156. When the voltage across this capacitor reaches the peak emitter voltage of transistor 152, unijunction transistor 152 fires and a voltage pulse is applied across transformer 147 to the base of transistor 137 in flip-flop 76. This pulse turns transistor 137 on which in turn switches off transistor 124, changing the state of flip-flop 76. The collector potential $V_c$ of transistor 137 drops virtually to ground potential (FIG. 17g) and the collector potential of transistor 124 rises to approximately $V_x$ (FIG. 17f). With $V_c$ of transistor 137 at nearly ground potential, no bias voltage is applied to the base-two connection of unijunction transistor 152, and hence after capacitor 156 discharges through this unijunction transistor, current $I_2$ continues to flow through resistor 155, the emitter to base-one junction of transistor 152, and the saturated primary winding 148 of transformer 147. At the same instant that flip-flop 76 changed states, the collector voltave $V_c$ of transistor 124 rose to approximately $V_x$, thus applying a bias voltage to the base-two connection of unijunction transistor 117, reverse-biasing the emitter to base-one junction of this transistor. Accordingly the current $I_1$ no longer flows through transistor 117 and instead begins to charge capacitor 120 in the linear manner. From this description of a half-cycle of operation of the flip-flop circuit, the subsequent half-cycle and successive operation of the circuit is readily apparent.

It is again emphasized that the operation of the circuits depicted in FIGS. 14 and 15 is inherently free of aberrations due to temperature variation. Flip-flop 76 can be designated to operate over a wide range of temperatures. In addition, with proper design of the unijunction circuits, the voltage level at which the unijunction transistors fire can be established at a very stable level to provide a corresponding stability of the durations of the timing signals $t_1$ and $t_2$.

After the foregoing description of the interconnection and operation of the control circuit depicted in FIGS. 13–16, it can readily be shown that the volt-time integrals which are present when the described control circuit of this invention is constructed and operated are precisely those which allow practice of the advantageous methods detailed in the earlier portion of the specification. It has been emphasized that the control circuit is designed so that the magnitudes of the currents $I_1$ and $I_2$ are variable, but the sum of the magnitudes of these two currents is always a constant value. For this demonstration let R represent this constant amplitude value.

$$I_1 + I_2 = R \qquad (3)$$

From the foregoing explanation, and particularly in connection with the equivalent circuit of FIG. 16, it is manifest that $$I_1 = \frac{V_p C_1}{t_1}, \text{ and } I_2 = \frac{V_p C_2}{t_2} \qquad (4, 5)$$

The term $t_1$ used in connection with FIGS. 16 and 17 corresponds to the term A used with FIGS. 2–8, and similarly the term $(t_1+t_2)$ corresponds to the term T. Thus, with $t_1=A$ and $t_2=T-t_1$, it follows that $$\frac{V_p C_1}{A} + \frac{V_p C_2}{T-A} = R \qquad (6)$$

By selecting the magnitude of $C_1$ to be equal to $C_2$, it follows that the products $V_p C_1$ and $V_p C_2$ are constants, and are equal to each other. Lettering S represent this constant value $$\frac{S}{A} + \frac{S}{T-A} = R \qquad (7)$$

Dividing both sides by S $$\frac{1}{A} + \frac{1}{T-A} = \frac{R}{S} \qquad (8)$$

Combining terms $$\frac{T}{AT-A^2} = \frac{R}{S} \qquad (9)$$

Inverting both sides $$\frac{AT-A^2}{T} = \frac{S}{R} \qquad (10)$$

Simplifying $$A - \frac{A^2}{T} = \frac{S}{R} \qquad (11)$$

Because R and S are both constants, the term $$A - \frac{A^2}{T}$$

for the described control circuit is also a constant. As noted above in Equation 1, this term, in connection with the input voltage $V_i$, is the generalized expression for the volt-time integral applied to the filter choke, when the described control circuit is utilized to open and close the semiconductor switches in the chopper. Thus operation of the chopper with the minimum size of filter choke is attained, while still operating the system to obtain a wide range of output voltage.

Solely to assist those skilled in the art to practice this invention, a table of component identifications and values for the circuits of FIGS. 14 and 15 is set out below. This information is given solely to implement practice of the invention, and in no sense by way of limitation.

| Component: | Identification or value |
|---|---|
| 80, 81, 124, 137 | 2N3642. |
| 82, 83 | 2N3638. |
| 117, 152 | 2N2647. |
| 95 | 1N4743. |
| 102, 107 | 1N4738. |
| 115 | 1N4740. |
| 122, 126, 132, 143, 150, 154 | 1N659. |
| 120, 156 | 1.27µfd. |
| 136, 141 | 300µfd. |
| 103, 108 | 0–5K ohms. |
| 118, 155 | 22 ohms. |
| 121, 153 | 100 ohms. |
| 125, 151 | 120 ohms. |
| 144, 123, 138 | 220 ohms. |
| 96, 98 | 470 ohms. |
| 105, 111 | 680 ohms. |
| 101, 106 | 750 ohms. |
| 94 | 1K ohms. |
| 104, 110 | 1.8K ohms. |
| 131, 145 | 2.2K ohms. |
| 113, 135, 140, 144 | 8.2K ohms. |

While only a particular embodiment of the invention has been described and illustrated, it will be apparent to those skilled in the art that various changes and modifications may be made therein without departing from the invention in its broader aspects. Therefore the aim in the appended claims is to cover all such changes and modifications as may fall within the true spirit and scope of the invention.

What is claimed is:

1. A DC–to–DC conversion system, including a chopper circuit having at least one semiconductor switch, means for applying an energizing voltage to the chopper circuit, an output circuit for passing an output voltage from the chopper to a load, and a filter including an inductor coupled in series between the chopper circuit and the output circuit, wherein the improvement comprises a control circuit for regulating switching of said semiconductor switch, including:
   first circuit means for providing first and second control signals and for maintaining the sum of said control signals substantially constant;
   second circuit means, coupled to said first circuit means, for providing a timing signal having first and second timing portions which are inversely related to said first and second control signals, and for applying said timing signal to the chopper circuit to regulate the chopper on and off dwell times in accordance with the first and second timing portions of the timing signal; and
   means for adjusting one of said control signals to correspondingly adjust the first and second timing portions of said timing signal, thus affording operation of the DC–to–DC conversion system to minimize the size of the filter inductor for a given set of chopper operating conditions such as output voltage range, maximum chopper frequency and minimum pulse width.

2. A DC–to–DC conversion system as claimed in claim 1 in which said first circuit means provides current signals as said first and second control signals for alternately charging at least one capacitor to a predetermined level, such that the times required to charge the capacitor by each of the currents are substantially equal to the on and off dwell times of the chopper.

3. A DC–to–DC conversion system as claimed in claim 2, in which first and second capacitors are provided and connected for charging by the first and second current signals.

4. A DC–to–DC conversion system as claimed in claim 1, in which said first circuit means includes an amplifier for providing said first and second control signals which always add to the same sum, and input means connected to apply a variable input signal to said amplifier to change the magnitudes of the first and second control signals and effect a corresponding change in the output voltage of the chopper circuit.

5. A control circuit as claimed in claim 2, wherein said second circuit means includes a flip-flop circuit connected to change state responsive to the expiration of each capacitor-charging interval, and in which said timing signal is provided by the complementary outputs of the flip-flop stage to control the on and off times of the semiconductor switch in the chopper circuit.

6. DC–to–DC conversion system, including a chopper circuit having a pair of semiconductor switches, means for applying an energizing voltage to the chopper circuit, an output circuit for passing an output voltage from the chopper to a load, and a filter including an inductor coupled in series between the chopper circuit and the output circuit, wherein the improvement comprises a control circuit for regulating switching of said semiconductor switches, including:
   input means for providing a variable input signal;
   amplifier means, coupled to said input means, having first and second output conductors for providing respective first and second complementary signals which always add to the same sum;
   a flip-flop stage, having first and second output connections connected to pass respective gating signals to said pair of semiconductor switches, and first and second input connections; and
   first and second signal channels, respectively coupled between first and second output conductors of the amplifier means and said flip-flop stage, for changing the state of said flip-flop each time one of said first and second complementary signals reaches a predetermined level, thus to regulate gating of said pair of semi-conductor switches and provide operation of the DC–to–DC conversion system to minimize the size of the filter inductor for a given set of chopper operating conditions such as output voltage range, maximum chopper frequency and minimum pulse width.

7. A DC–to–DC conversion system as claimed in claim 6 in which each of said first and second signal channels includes:
   a sensing and clamping circuit, coupled to one of said output conductors of the amplifier means;
   a pulse circuit, coupled between said sensing and clamping circuit and one of said input connections of the flip-flop stage; and
   a feedback conductor, coupled between a feedback connection of said flip-flop stage and said sensing and clamping circuit, to apply a signal to the sensing and clamping circuit which indicates the state of the flip-flop stage.

8. A DC–to–DC conversion system including a chopper circuit having a pair of semiconductor switches, means for applying an energizing voltage to the chopper circuit, an output circuit for passing an output voltage from the chopper to a load, and a filter including an inductor coupled in series between the chopper circuit and the output circuit, wherein the improvement comprises a control circuit for regulating switching of said semiconductor switches, including:
   a signal input circuit for providing a variable input signal;
   an amplifier circuit, coupled to said signal input circuit, having first and second output conductors for providing respective complementary first and second capacitor charging signals;

a flip-flop stage, having first and second output conductors connected to pass respective gating signals to said first and second semiconductor switches, first and second input connections, and first and second feedback connections;

a first signal channel, including a first sensing and clamping circuit coupled to said first output conductor of the amplifier circuit, and a first pulse circuit coupled between said first sensing and clamping circuit and the first input connection of said flip-flop, to effect a change in state of said flip-flop each time said first capacitor charging signal reaches a predetermined level;

a first feedback conductor, coupled between said first feedback connection of the flip-flop and said first sensing and clamping circuit, for providing a signal indicating the state of said flip-flop to said first sensing and clamping circuit;

a second signal channel, including a second sensing and clamping circuit coupled to said second output conductor of the amplifier circuit, and a second pulse circuit coupled between said second and clamping circuit and the second input connection of said flip-flop, to effect a change in state of said flip-flop each time said second capacitor charging signal reaches a predetermined level; and a second feedback conductor, coupled between said second feedback connection of the flip-flop and said second sensing and clamping circuit, for providing a signal indicating the state of said flip-flop to said second sensing and clamping circuit, thus affording operation of the DC-to-DC conversion system to minimize the size of the filter inductor for a given set of chopper operating conditions such as output voltage range, maximum chopper frequency and minimum pulse width.

9. A DC-to-DC conversion system as claimed in claim 8 in which said amplifier circuit includes a difference amplifier and said complementary first and second capacitor charging signals are current signals which always add to the same magnitude, so that as said variable input signal changes to effect an increase in the current level of one of said capacitor charging signals, the other of said capacitor charging signals is changed in an equal amount and in an opposite sense.

References Cited

UNITED STATES PATENTS

| | | | |
|---|---|---|---|
| 3,226,630 | 12/1965 | Lampke | 321—9A |
| 3,376,492 | 4/1968 | Morgan et al. | 321—43 |
| 3,452,266 | 6/1969 | Borden et al. | 321—43X |

WILLIAM M. SHOOP, Jr., Primary Examiner

U.S. Cl. X.R.

321—43